US007983505B2

(12) United States Patent
Subedar et al.

(10) Patent No.: US 7,983,505 B2
(45) Date of Patent: Jul. 19, 2011

(54) PERFORMING DEBLOCKING ON PIXEL DATA

(75) Inventors: Mahesh M. Subedar, Laveen, AZ (US); Jorge E. Caviedes, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1095 days.

(21) Appl. No.: 11/731,234

(22) Filed: Mar. 30, 2007

(65) Prior Publication Data

US 2008/0240604 A1    Oct. 2, 2008

(51) Int. Cl.
*G06K 9/40* (2006.01)
*G06K 9/36* (2006.01)
*G06K 9/46* (2006.01)
*H04N 5/93* (2006.01)
*H04N 7/14* (2006.01)
*H04N 7/01* (2006.01)
*H04N 11/20* (2006.01)

(52) U.S. Cl. ........ 382/268; 382/232; 382/269; 382/274; 382/275; 348/14.13; 348/441; 348/446; 386/353

(58) Field of Classification Search .................. 382/100, 382/232–253; 348/14.13, 441, 446–452; 386/27, 33, 109–112
See application file for complete search history.

(56) References Cited

U.S. PATENT DOCUMENTS

| 2003/0026478 A1* | 2/2003 | Jones et al. ................... 382/170 |
| 2003/0053702 A1* | 3/2003 | Hu ................................ 382/238 |
| 2003/0095203 A1* | 5/2003 | MacInnis et al. ............. 348/441 |
| 2003/0128280 A1* | 7/2003 | Perlmutter et al. .......... 348/222.1 |
| 2006/0251174 A1 | 11/2006 | Caviedes et al. ......... 375/240.24 |

OTHER PUBLICATIONS

U.S. Appl. No. 11/239,946, filed Sep. 30, 2005, entitled "Method and System for Detecting and Deblocking Variable-Size Grid Artifacts in Coded Video," by Walid S. Ali, et al.
U.S. Appl. No. 11/238,710, filed Sep. 29, 2005, entitled "Method and Apparatus for Blocking Artifact Detection and Measurement in Block-Coded Video," by Jorge E. Caviedes, et al.

* cited by examiner

*Primary Examiner* — Vu Le
*Assistant Examiner* — Nathan Bloom
(74) *Attorney, Agent, or Firm* — Trop, Pruner & Hu, P.C.

(57) ABSTRACT

In one embodiment, the present invention includes a method for receiving pixel data for a portion of an image including a blocking artifact, calculating an artifact strength based on a difference between a two pixels on opposite sides of the blocking artifact, performing a local adaptability check using the artifact strength and values multiple pixels on the opposite sides, performing deblocking based on a result of the local adaptability check, applying a soft threshold to the artifact strength to adjust a value of the artifact strength, and re-aligning one or more pixels on the opposite sides based on the original value of the pixels and a pixel index value. Other embodiments are described and claimed.

8 Claims, 4 Drawing Sheets

PERFORMING DEBLOCKING ON PIXEL DATA

BACKGROUND

Block-encoded video, such as video encoded using techniques compatible with the Moving Picture Experts Group (MPEG) (e.g., MPEG-2, and/or MPEG-4 video data, also in accordance with International Telecommunication Union (ITU-T) Rec. H.264 (2003)), may suffer from discontinuities at block boundaries, particularly when encoded at low bit rates where large quantization errors may occur. Such discontinuities may appear in the reconstructed video frames as blocking artifacts (e.g., visible block edges, mosaic patterns, tiling effects, etc.), particularly in image regions that are smooth.

Deblocking filters implement methods such as variable length filtering and/or edge protection may reduce the magnitude of blocking artifacts to a visually-acceptable level. Further, this filtering is complex and it is difficult to deblock data of different block sizes.

DETAILED DESCRIPTION

In various embodiments, a deblocking algorithm can reduce blocking artifacts seen in block-encoded video, such as MPEG-2 data. Embodiments may be used to clean blocking artifacts for different grid sizes (e.g., with a minimum grid size of 4). For example, embodiments can be used to deblock H.264 content independently of an available H.264 loop deblocking filter. As used herein, the terms deblocking algorithm and blocking noise reduction algorithm are used interchangeably.

The deblocking algorithm may operate in the spatial domain, and may be used to provide energy redistribution in which pixels may be re-aligned across the edges of an artifact. Re-alignment may be followed by a selective m×m (e.g., 3×3 window) low pass filtering step which attempts to blend the deblocked pixels with neighboring pixels. Soft thresholds may be applied to reduce flicker. The deblocking algorithm can be either applied to only a luminance (Y) component or to all three components of a color space (e.g., a luminance/chromimine (YUV) color space).

In various embodiments, pixel re-alignment may be based on local characteristics of the content. Furthermore, selective low-pass filtering may be applied, along with soft thresholds to avoid flickering at an output image.

Figure 1:
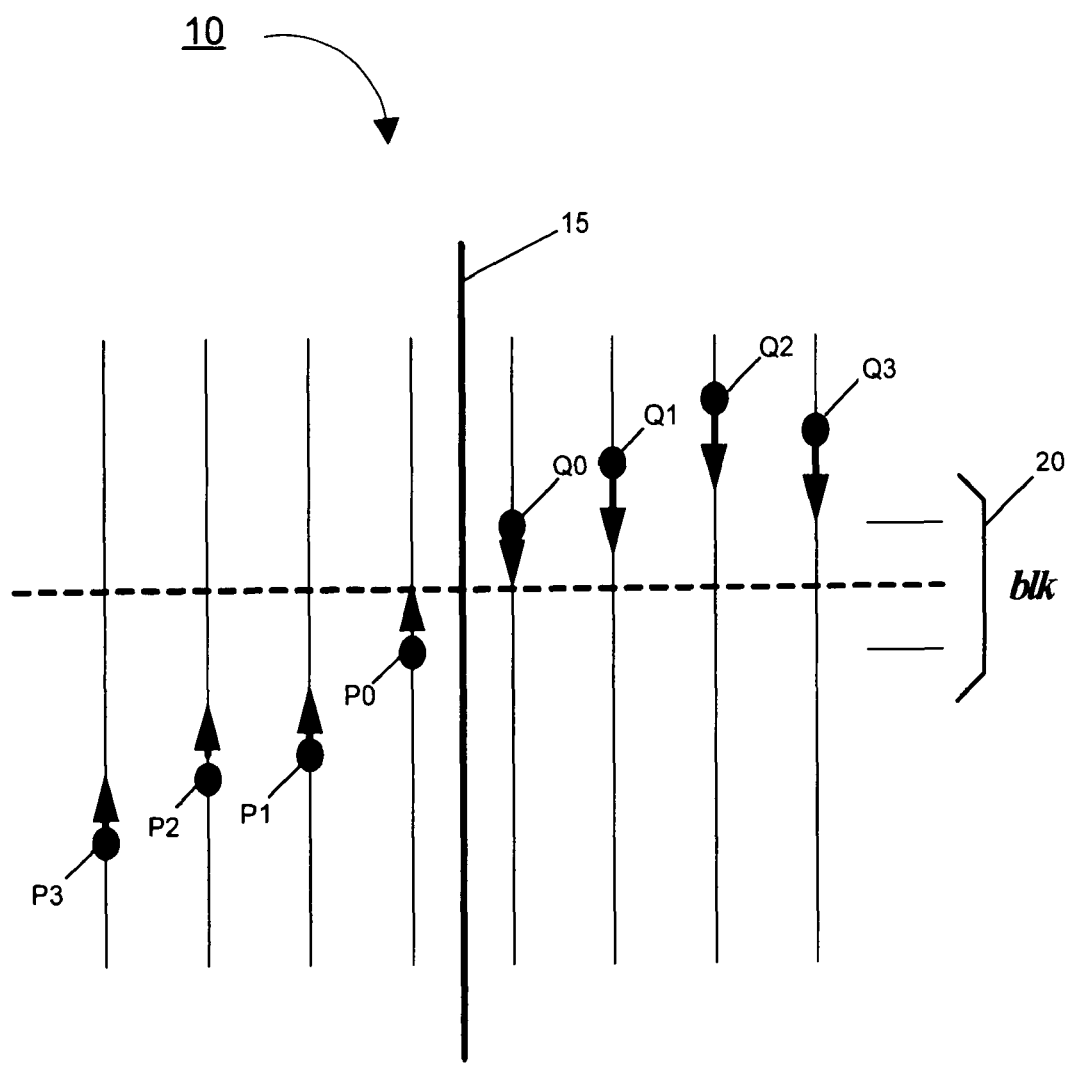
FIG. 1 is an illustration of a group of pixels surrounding an artifact to be realigned in accordance with an embodiment of the present invention.

Referring now to FIG. 1, shown is a group of pixels in a portion of an image 10 that includes an artifact 15. As shown in FIG. 1, a plurality of pixels on the left hand side P0-P3 of artifact 15 are present, as well as a plurality of pixels on the right hand side of artifact 15, i.e., pixels Q0-Q3. By performing a pixel realignment in accordance with an embodiment of the present invention, deblocking may remove the impact of the artifact. While shown with a vertical artifact in the embodiment of FIG. 1, embodiments may be also used in connection with horizontal artifacts. Also shown in FIG. 1 is an artifact strength 20 also referred to herein as blk, which may be based on a difference between adjacent pixels to artifact 15, i.e., a first P pixel, P0 and a first Q pixel, Q0.

Figure 2:
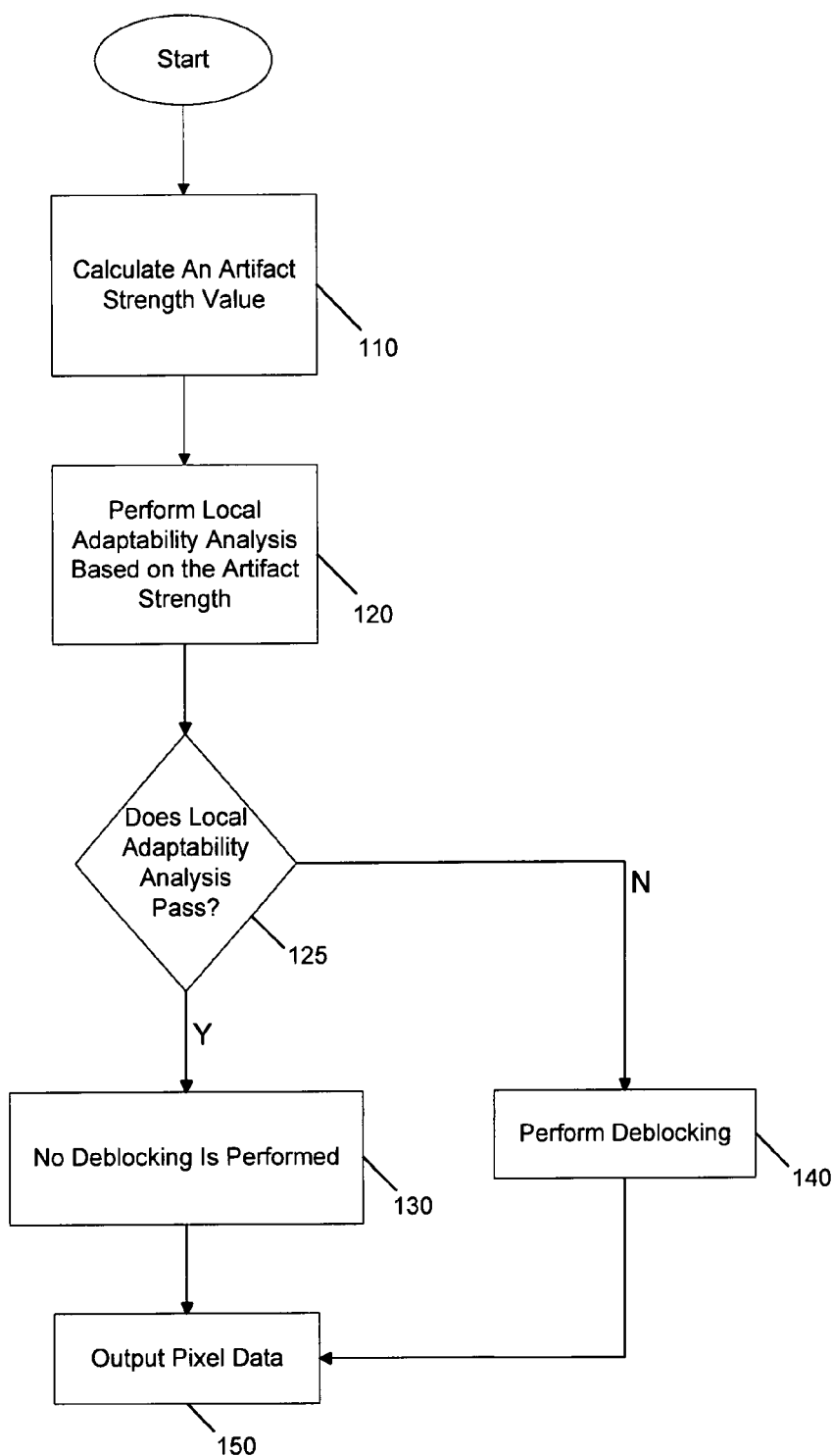
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 may be performed to implement deblocking. As show in FIG. 2, method 100 may begin by calculating an artifact strength value (block 110). While the scope of the present invention is not limited in this regard, in one embodiment the artifact strength may be calculated based on a difference between the pixels adjacent to the artifact. More specifically, in one embodiment the blk may be calculated as set forth in Equation 1, and the absolute value of the artifact strength may be determined as set forth in Equation 2.

$$blk=(p_0-q_0) \qquad [1]$$

$$ablk=abs(blk) \qquad [2]$$

Still referring to FIG. 2, next a local adaptability analysis may be performed based on the artifact strength (block 120). Such local adaptability analysis may be performed based on the artifact strength so that the texture region or true edges are not blurred. In one embodiment, the local adaptability analysis may be performed in accordance with Equations 3 to 6.

$$diff1=abs(p1-p0) \qquad [3]$$

$$diff2=abs(q1-q0) \qquad [4]$$

$$adiff=abs(diff1-diff2) \qquad [5]$$

$$\text{If } (diff1<ablk/2) \text{ \&\& } (diff2<ablk/2) \text{ \&\& } (adiff<ablk/2) \qquad [6]$$

Do Deblocking
Else
Do not Deblock

Based on the local check analysis, it may then be determined whether to perform deblocking. Specifically, in one embodiment the decision may be based on whether the local adaptability analysis passes the IF test of Equation 6 (diamond 125).

Referring still to FIG. 2, if the local adaptability analysis passes, control passes to block 130 where no deblocking is performed. Instead, the original pixel data received by the algorithm may be passed on for further video processing such as outputting pixel data (block 150). If instead it is determined that the local adaptability analysis does not pass, control passes from diamond 125 to block 140, where deblocking may be performed, and then control passes to block 150, as above.

Figure 3:
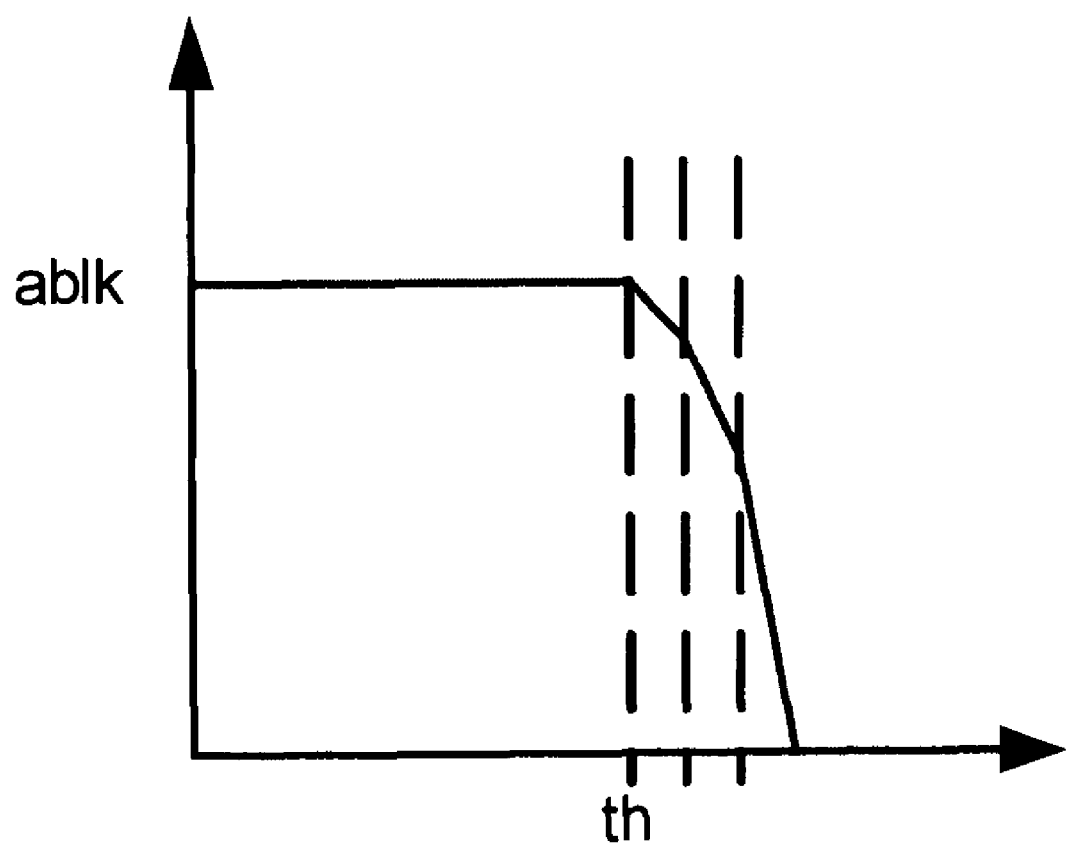
FIG. 3 is a graphical representation of soft thresholding in accordance with an embodiment of the present invention.

In various embodiments, the deblocking may be implemented using a deblocking filter that applies a soft threshold to the artifact strength. In various embodiments, deblocking may be performed by applying a soft threshold to the artifact strength value as set forth in Equations 7 to 11 below. In this way, a faster roll over of the artifact strength to zero over a threshold th may be realized as shown in FIG. 3, which is a graphical representation of soft thresholding applied to the artifact strength in accordance with an embodiment of the present invention. Of course, this thresholding may be implemented in other ways. In general, a soft threshold is applied rather than a hard threshold to avoid flicker in the output. Note that in Equations 9 to 11, sign is −1 if blk is negative and sign is +1 if blk is positive.

assert($th+16>=32$); if ($ablk<th$) [7]

$blk=blk$, else if ($ablk<th+2$) [8]

$blk=\text{sign}*(ablk-4)$; else if ($ablk<th+8$) [9]

$blk=\text{sign}*(ablk-16)$; else if ($ablk<th+16$) [10]

$blk=\text{sign}*(ablk-32)$; else $blk=0$ [11]

Figure 4:
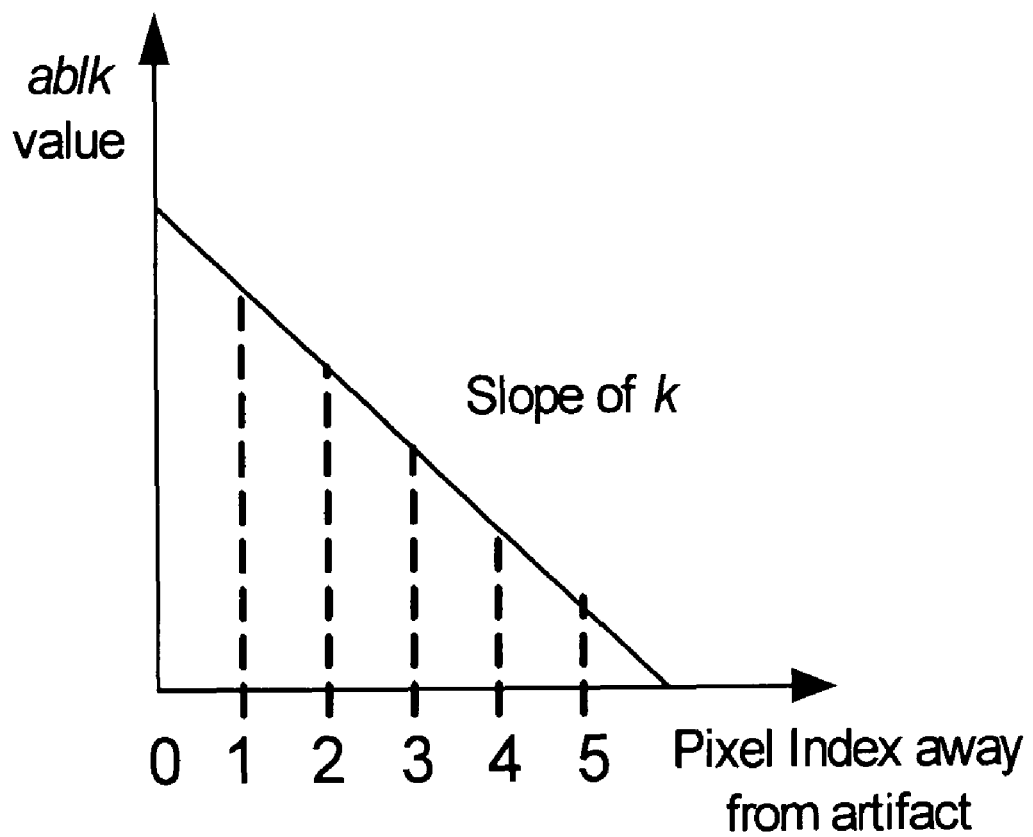
FIG. 4 is a graphical representation of artifact strength versus pixel index in accordance with an embodiment of the present invention.

After soft thresholding is performed, pixel re-alignment may be applied to n pixels (e.g., 2 pixels) on each side of the artifact, in accordance with Equations 12 to 15.

$$p_1 = p_1 - blk2 \quad [12]$$

$$p_0 = p_0 - blk1 \quad [13]$$

$$q_0 = q_0 + blk1 \quad [14]$$

$$q_1 = q_1 + blk2 \quad [15]$$

where blk1, blk2 are calculated to be points on a line with a given slope k as shown in FIG. 4, which is a graphical representation of artifact strength versus a pixel index (with respect to distance from the artifact). Performing Equations 12-15 with a slope of −1, the following values for blk 1 and blk 2 may be obtained:

$$blk1 = blk/2 \text{ and } blk2 = blk/4. \quad [16]$$

After pixel re-alignment, a low-pass filtering process may be applied to the re-aligned pixels. While the scope of the present invention is not limited in this regard, a n×n (e.g., 3×3 window) low-pass filter may be applied to the realigned pixels.

In some embodiments, before applying the low-pass filtering, a threshold process is performed on the surrounding pixels (i.e., the pixels surrounding a given one of the re-aligned pixels that is to be filtered). In this thresholding process, if a surrounding pixel and the pixel to be filtered differ by more than a given threshold (i.e., low-pass_Th), the surrounding pixel may be replaced by the center pixel, i.e., the re-aligned pixel. In various embodiments, low-pass_Th may be a function of the absolute value of the artifact strength. While different manners of performing low-pass filtering may be performed, shown in Table 1 is an exemplary 3×3 low-pass filter kernel that may be used.

TABLE 1

$$\begin{bmatrix} 1 & 1 & 1 \\ 1 & 4 & 1 \\ 1 & 1 & 1 \end{bmatrix}$$

Accordingly, embodiments may provide for better output quality with minimal complexity. Furthermore, different types of incoming image data such as MPEG and H.264 data may be deblocked using the same process. That is, embodiments may be used for any block sizes, as the processing remains the same.

Embodiments may be implemented in an algorithm that can be executed in many different system types. For example, such systems can include digital imaging devices such as digital cameras, digital televisions, digital video devices and so forth. Similarly, embodiments may be implemented in computer systems such as server computers, personal computers, mobile devices such as cellular telephones and so forth. In such processor-based systems, an algorithm in accordance with an embodiment may be performed in a general-purpose processor such as a microprocessor, a graphics processing unit (GPU) or other such processing unit.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving pixel data for a portion of an image including a blocking artifact;
   calculating an artifact strength based on a difference between a first pixel on a first side of the blocking artifact and a second pixel on a second side of the blocking artifact;
   performing a local adaptability check using the artifact strength and values of the first pixel on the first side, a second pixel on the first side, a first pixel on the second side, and the second pixel on the second side;
   performing deblocking based on a result of the local adaptability check;
   applying a soft threshold to the artifact strength to adjust a value of the artifact strength;
   re-aligning a predetermined number of pixels on the first and second sides of the blocking artifact based on the original value of the predetermined number of pixels and a pixel index value;
   low pass filtering each of the re-aligned pixels;
   performing a second thresholding before the low pass filtering as a function of an absolute value of the artifact strength; and
   replacing a surrounding pixel with the re-aligned pixel based on the second thresholding.

2. The method of claim 1, wherein the predetermined number of pixels comprises two pixels on each side of the blocking artifact.

3. The method of claim 1, wherein the local adaptability check comprises determining absolute value differences between first and second adjacent pixels on opposite sides of the blocking artifact, respectively, and comparing a difference between the absolute value differences to a measure of the artifact strength.

4. The method of claim 1, further comprising outputting the re-aligned pixels.

5. An apparatus comprising:
   a deblocker to receive pixel data for a portion of an image including a blocking artifact, calculate an artifact strength based on a difference between a first pixel on a first side of the blocking artifact and a second pixel on a second side of the blocking artifact, perform a local adaptability check using the artifact strength, and values of the first pixel on the first side, a second pixel on the first side, a first pixel on the second side, and the second pixel on the second side, perform deblocking based on a result of the local adaptability check, apply a soft threshold to the artifact strength to adjust a value of the artifact strength, and re-align a predetermined number of pixels on the first and second sides of the blocking artifact based on the original value of the predetermined number of pixels and a pixel index value: and a low pass filter to filter each of the re-aligned pixels, wherein the deblocker is to perform a second threshold process before the low pass filter as a function of an absolute value of the artifact strength and to replace a surrounding pixel with the re-aligned pixel based on the second threshold process.

6. The apparatus of claim 5, wherein the predetermined number of pixels comprises two pixels on each side of the blocking artifact.

7. The apparatus of claim 5, wherein the deblocker is to determine absolute value differences between first and second adjacent pixels on opposite sides of the blocking artifact, respectively, and compare a difference between the absolute value differences to a measure of the artifact strength.

8. The apparatus of claim 5, wherein the deblocker is to receive pixel data of different protocols having different grid sizes.

* * * * *